(12) United States Patent
Higashibeppu

(10) Patent No.: US 9,641,666 B2
(45) Date of Patent: May 2, 2017

(54) TERMINAL DEVICE, PROCESSING METHOD, AND PROGRAM

(71) Applicant: NEC CASIO MOBILE COMMUNICATIONS, LTD., Kanagawa (JP)

(72) Inventor: Satoshi Higashibeppu, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/376,439

(22) PCT Filed: Oct. 2, 2012

(86) PCT No.: PCT/JP2012/006289
§ 371 (c)(1),
(2) Date: Aug. 4, 2014

(87) PCT Pub. No.: WO2013/114482
PCT Pub. Date: Aug. 8, 2013

(65) Prior Publication Data
US 2015/0004939 A1   Jan. 1, 2015

(30) Foreign Application Priority Data
Feb. 3, 2012   (JP) .................................. 2012-021966

(51) Int. Cl.
*H04M 1/66* (2006.01)
*H04M 1/68* (2006.01)
(Continued)

(52) U.S. Cl.
CPC .... *H04M 1/72577* (2013.01); *G06F 3/04883* (2013.01); *G06F 3/04886* (2013.01);
(Continued)

(58) Field of Classification Search
CPC combination set(s) only.
See application file for complete search history.

(56) References Cited

U.S. PATENT DOCUMENTS 8,581,877 B2   11/2013   Yoo
8,872,796 B2   10/2014   Yoo
(Continued)

FOREIGN PATENT DOCUMENTS

EP   2144148   1/2010
EP   2383636   11/2011
(Continued)

OTHER PUBLICATIONS

International Search Report PCT/JP2012/006289 dated Jan. 8, 2013.
(Continued)

*Primary Examiner* — Idowu O Osifade
(74) *Attorney, Agent, or Firm* — Young & Thompson

(57) ABSTRACT

A terminal device includes a detection section for detecting an operation to a display section, a processing section for executing processing in accordance with the detected operation, a display control section for displaying a picto on a first display area in a lock screen and displaying an unlock icon on a second display area, a first judgment section for judging as an unlock operation an operation of performing an operation to the unlock icon and then performing an operation to move the icon from the second display area to a third display area, a screen shift section for shifting the lock screen to a predetermined screen in response to the unlock operation, and a second judgment section for judging that a display picto function execution operation has been performed when a predetermined operation to the display section other than the unlock operation is detected.

9 Claims, 13 Drawing Sheets

(51) Int. Cl.

| | | |
|---|---|---|
| *H04M 3/16* | (2006.01) | |
| *H04M 1/725* | (2006.01) | |
| *G06F 3/0488* | (2013.01) | |
| *H04M 1/67* | (2006.01) | |
| *H04W 12/08* | (2009.01) | |
| *H04W 88/02* | (2009.01) | |
| *G06F 21/31* | (2013.01) | |

(52) U.S. Cl.
CPC .............. *G06F 21/31* (2013.01); *H04M 1/67* (2013.01); *H04W 12/08* (2013.01); *H04W 88/02* (2013.01); *H04M 2250/22* (2013.01)

(56) References Cited

U.S. PATENT DOCUMENTS

| | | | |
|---|---|---|---|
| 9,342,235 B2 | 5/2016 | Shimazu et al. | |
| 2009/0083847 A1 | 3/2009 | Fadell et al. | |
| 2009/0083850 A1 | 3/2009 | Fadell et al. | |
| 2010/0001967 A1* | 1/2010 | Yoo | G06F 3/0488 345/173 |
| 2011/0252357 A1* | 10/2011 | Chaudhri | G06F 3/04883 715/780 |
| 2012/0046077 A1* | 2/2012 | Kim | H04M 1/72577 455/566 |
| 2013/0086522 A1 | 4/2013 | Shimazu et al. | |
| 2014/0066131 A1 | 3/2014 | Yoo | |
| 2014/0112555 A1 | 4/2014 | Fadell et al. | |
| 2014/0115694 A1 | 4/2014 | Fadell et al. | |
| 2014/0115695 A1 | 4/2014 | Fadell et al. | |
| 2014/0115696 A1 | 4/2014 | Fadell et al. | |
| 2014/0289843 A1* | 9/2014 | Chiang | G06F 3/04883 726/19 |
| 2015/0020030 A1 | 1/2015 | Yoo | |

FOREIGN PATENT DOCUMENTS

| | | |
|---|---|---|
| JP | 2009-123208 | 6/2009 |
| JP | 2010-541046 A | 12/2010 |
| JP | 2013-93020 | 5/2013 |
| WO | 2009042392 A2 | 4/2009 |
| WO | 2009042392 A3 | 4/2009 |

OTHER PUBLICATIONS

Junichiro Yamazaki, iPad Shigoto Katsuyojutsu!, 1st edition, Socym Co., Ltd., Aug. 10, 2010, p. 220, http://www.socym.co.jp/.
Extended European search report, dated Aug. 20, 2015; Application No. 12867181.5.
Japanese Office Action for Patent Application No. JP 2013-556044 dated May 23, 2016, with English translation.

* cited by examiner

FIG. 3

M3 DISPLAY PICTO INFORMATION STORAGE SECTION

| PICTO ID | NAME | IMAGE DATA | OPERATION TARGET FLAG | PICTO FUNCTION | ... |
|---|---|---|---|---|---|
| A001 | RADIO WAVE PICTO | **** | O | RADIO WAVE OFF SETTING | ... |
| A002 | BATTERY PICTO | **** | O | REMAINING BATTERY DETAIL DISPLAY | ... |
| | | | | POWER SAVING SETTING | ... |
| A003 | MAIL PICTO | **** | O | NEWLY ARRIVED MAIL DISPLAY | ... |
| ... | ... | ... | ... | ... | ... |

FIG. 10
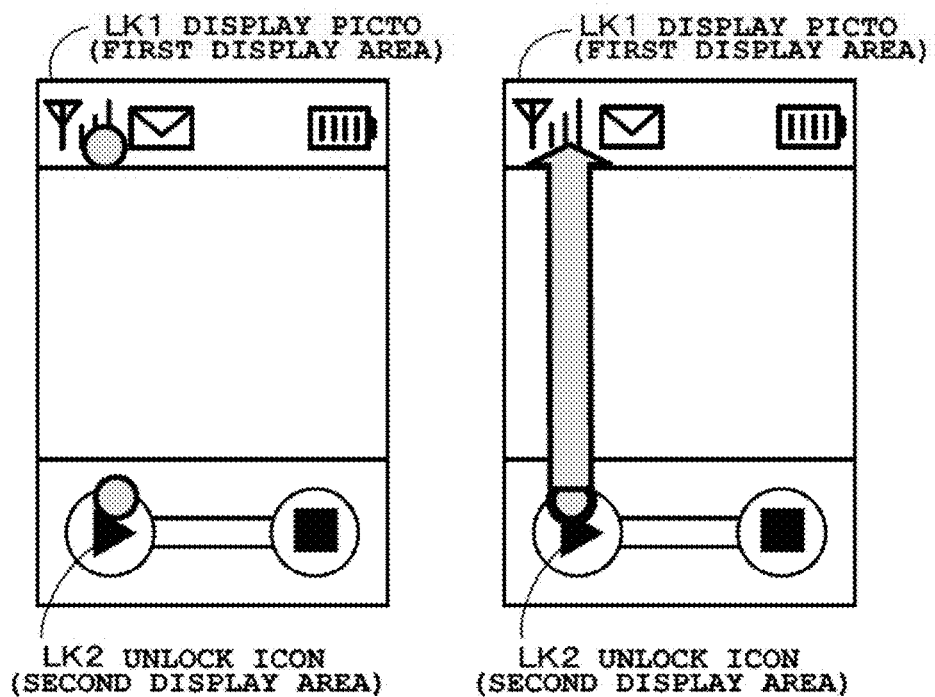
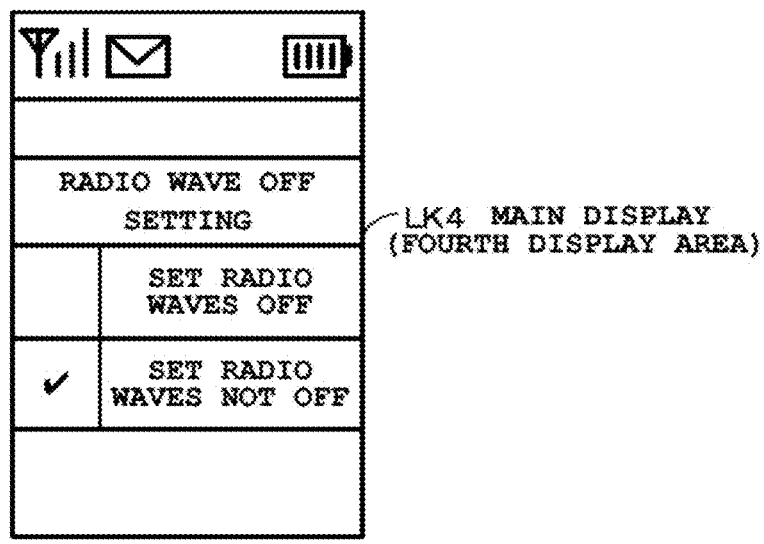

FIG. 12
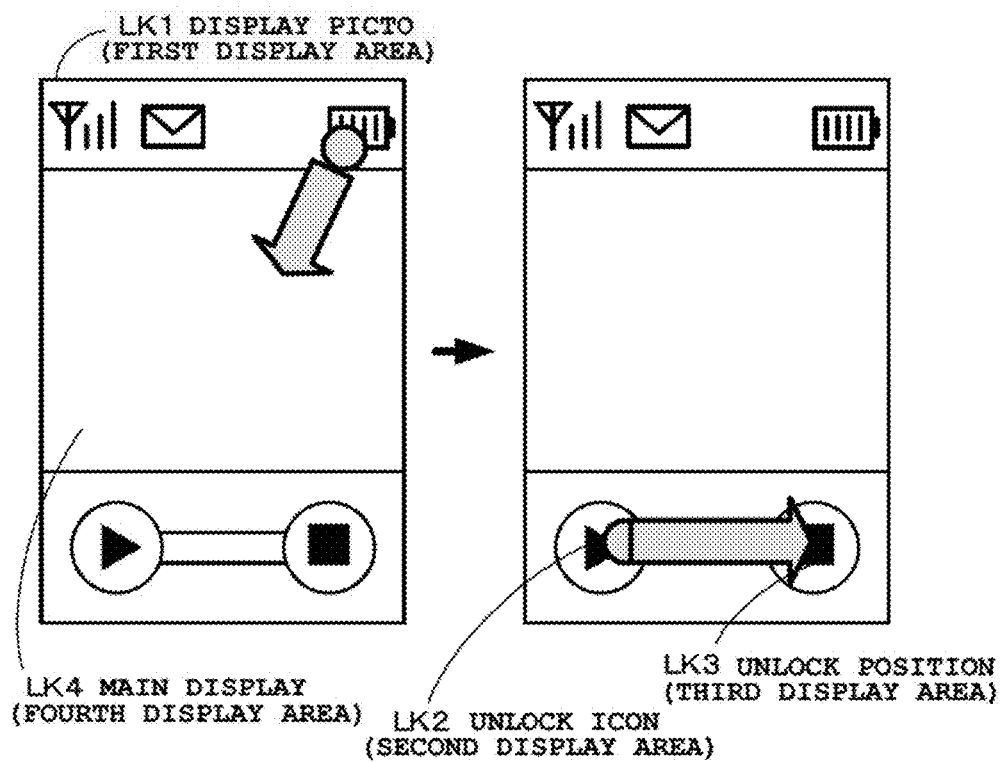
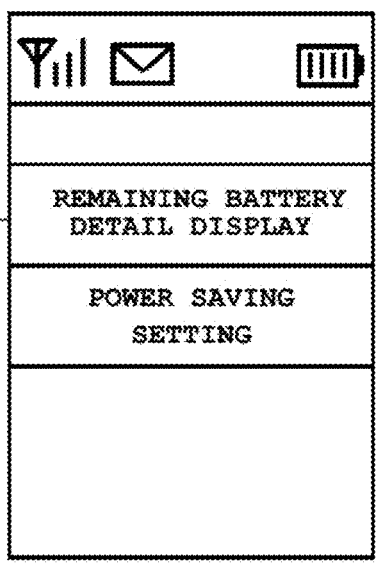

TERMINAL DEVICE, PROCESSING METHOD, AND PROGRAM

CROSS-REFERENCE TO RELATED APPLICATIONS

This is a national stage of International Application No. PCT/JP2012/006289 filed Oct. 2, 2012, claiming priority based on Japanese Patent Application No. 2012-021966 filed Feb. 3, 2012, the entire contents of which are incorporated herein by reference.

TECHNICAL FIELD

The present invention relates to a terminal device that executes processing in response to an operation to a display section when the operation is performed, a processing method, and a program.

BACKGROUND ART

Generally, in a terminal device such as a mobile phone, on a display section (display screen) that displays various pieces of data and information, when a contact operation to contact to the display section is performed or a noncontact operation to come close to the display section is performed, the contact operation or the noncontact operation is detected. That is, when a transparent contact sensor that detects contact of an object is arranged on the surface of the display section, contact of operating instrument or a finger to the display section is detected as a contact operation by the contact sensor. In addition, when a noncontact sensor that detects movement of an object that is present at a short distance through capacitance and the like is arranged, movement of operating instrument or a finger on the display section (operating instrument or a finger may not be in contact with the display screen) is detected as a noncontact operation by the noncontact sensor.

As the terminal device such as the mobile phone configured to detect an operation that is performed on the display section and execute various pieces of processing in response to the operation as described above, there is a terminal device that displays a screen (lock screen) that is used to suppress acceptance of an erroneous operation (inadvertent operation or the like) on the display section in order to prevent such an operation. There are various operations to shift such a lock screen to another screen (that is, an unlock operation), and as one of the various operations, there is an operation to move an unlock icon displayed on the lock screen to a certain position.

For example, conventionally, as an example of a means for detecting an operation to the display section, a technology has been disclosed in which unlock is performed by an operation to move an unlock icon displayed on a lock screen to a certain position in an electronic device using a touch screen (see Patent Document 1).

PRIOR ART DOCUMENT

Patent Document

Patent Document 1: JP-T-2010-541046

SUMMARY OF INVENTION

Problem to be Solved by the Invention

However, in the technology of the above-described Patent Document, only an unlock operation on the lock screen is allowed to be accepted, and therefore, in order to perform another operation on the lock screen, the lock state needs to be unlocked once. For example, generally, display pictos such as a radio wave picto that clearly indicates a communication state, a battery picto that clearly indicates a remaining battery, and a mail picto that clearly indicates presence of reception of a newly arrived mail are displayed on the lock screen and, in a state where such a display picto is displayed on the lock screen, only an operation to perform the unlock is accepted, and as a result, even when a user performs an operation to the display picto so as to execute a function that corresponds to the display picto (for example, radio wave off setting for blocking radio waves when the display picto is the radio wave picto, and power-saving mode setting for suppressing power consumption when the display picto is the battery picto), such a function is not allowed to be executed, so that the lock state needs to be unlocked once, and there is a problem in that a large burden is applied to the user.

An object of the present invention is to easily execute a function that corresponds to a display picto without unlock of a lock screen in a state where the display picto is displayed on the lock screen for preventing an erroneous operation to a display section.

Means for Solving the Problem

In order to solve the above-described problem, a terminal device according to the present invention is a terminal device that includes a detection section for detecting an operation to a display section and a processing section for executing processing in accordance with the operation detected by the detection section, the terminal device comprising: a display control section for displaying a display picto on a first display area in a lock screen for preventing an erroneous operation to the display section, and display an unlock icon on a second display area; a first judgment section for judging that an unlock operation has been performed when the detection section detects an operation to the unlock icon in the second display area and then detects an operation to move the unlock icon from the second display area to a third display area; a screen shift section for shifting the lock screen to a predetermined screen when the first judgment section judges that the unlock operation has been performed; and a second judgment section for judging that a display picto function execution operation has been performed when the detection section detects a predetermined operation to the display section other than the unlock operation, wherein the processing section executes a function that corresponds to the display picto displayed on the first display area when the second judgment section judges that the display picto function execution operation has been performed.

In order to solve the above-described problem, a processing method according to the present invention is a processing method that includes: a display control step of displaying a display picto on a first display area in a lock screen for preventing an erroneous operation to a display section, and displaying an unlock icon on a second display area; a first judgment step of judging that an unlock operation has been performed when an operation to the unlock icon in the second display area is detected, and then an operation to move the unlock icon from the second display area to a third display area is detected; a screen shift step of shifting the lock screen to a predetermined screen when judged that the unlock operation has been performed; a second judgment step of judging that a display picto function execution operation has been performed when a predetermined operation to the display section other than the unlock operation is detected; and a processing step of executing a function that corresponds to the display picto displayed on the first display area when judged that the display picto function execution operation has been performed.

In order to solve the above-described problem, according to the present invention there is provided a non-transitory computer-readable storage medium having stored thereon a program that is executable by a computer of a terminal device to perform functions comprising: a display control function for displaying a display picto on a first display area in a lock screen for preventing an erroneous operation to a display section, and display an unlock icon on a second display area; a first judgment function for judging that an unlock operation has been performed when an operation to the unlock icon in the second display area is detected, and then an operation to move the unlock icon from the second display area to a third display area is detected; a screen shift function for shifting the lock screen to a predetermined screen when judged that the unlock operation has been performed; a second judgment function for judging that a display picto function execution operation has been performed when a predetermined operation to the display section other than the unlock operation is detected; and a processing function for executing a function that corresponds to the display picto displayed on the first display area when judged that the display picto function execution operation has been performed.

Effect of the Invention

According to the present invention, in a state where a display picto is displayed on a lock screen for preventing an erroneous operation to a display section, a function that corresponds to the display picto can be easily executed without unlock of the lock screen, so that it becomes rich in operability and convenience for the user.

BRIEF DESCRIPTION OF DRAWINGS

FIG. 3 is a diagram illustrating a display picto information storage section M3.

FIG. 10 is a diagram illustrating a case in which a predetermined operation other than the unlock operation is judged as a display picto function execution operation, and a function that corresponds to the display picto is executed.

FIG. 12 is a diagram illustrating a case in which an operation that is acquired by adding a predetermined operation to the unlock operation is judged as the display picto function execution operation, and a function that corresponds to the display picto is executed.

DESCRIPTION OF EMBODIMENTS

The embodiments of the present invention will be described in detail below with reference to the drawings.

First Embodiment

First, a first embodiment of the present invention is described with reference to FIG. 1 to FIG. 10.

Figure 1:
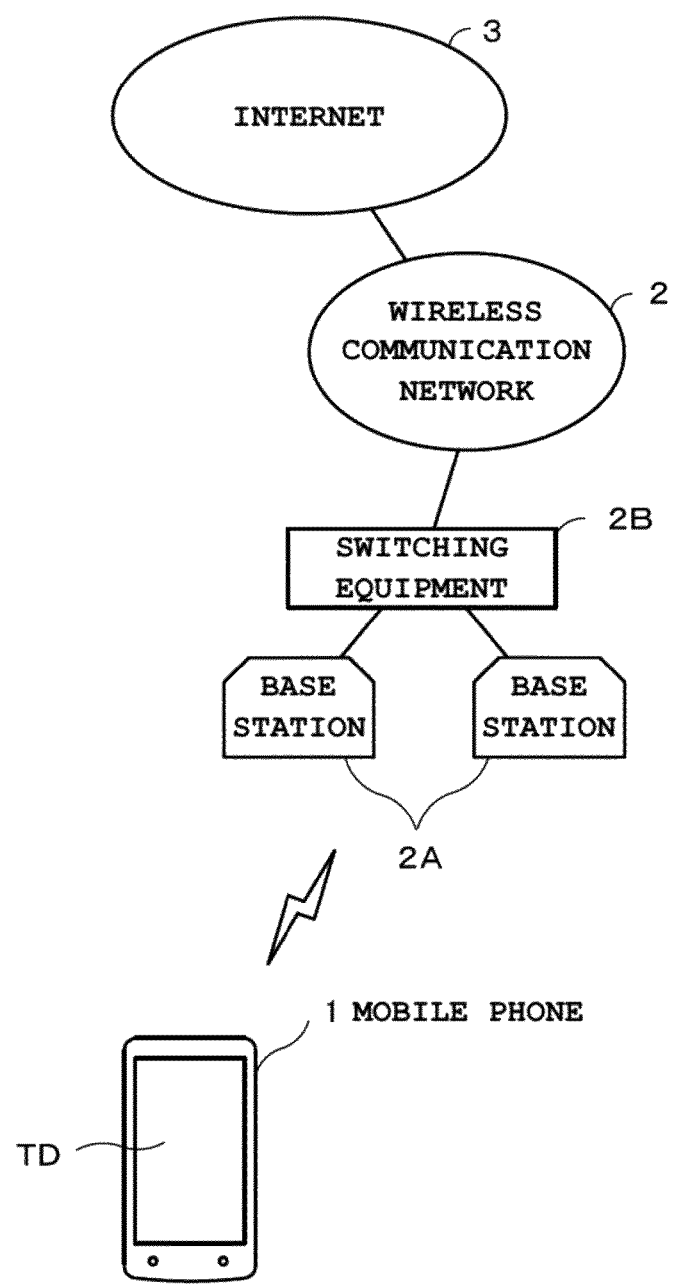
FIG. 1 is a block diagram depicting a communication network system in which a mobile phone 1 that is applied as a terminal device can be used.

FIG. 1 is a block diagram depicting a communication network system in which a mobile phone that is applied as a terminal device can be used.

The mobile phone 1 is, for example, a multifunction-type mobile phone that is called a smartphone, and includes a calling function, a touch input function, an electronic mail function, and an Internet connection function (Web access function), as basic functions, and a touch screen TD is arranged on an approximately entire area of the front surface of the housing. When the mobile phone 1 is connected to a wireless communication network (mobile communication network) 2 through the nearest base station 2A and switching device 2B, the mobile phone 1 becomes in a state where a call can be performed with another mobile phone (not illustrated) through the wireless communication network 2, and when the mobile phone 1 is connected to an Internet 3 through the wireless communication network 2, the mobile phone 1 can access and browse a website.

Figure 2:
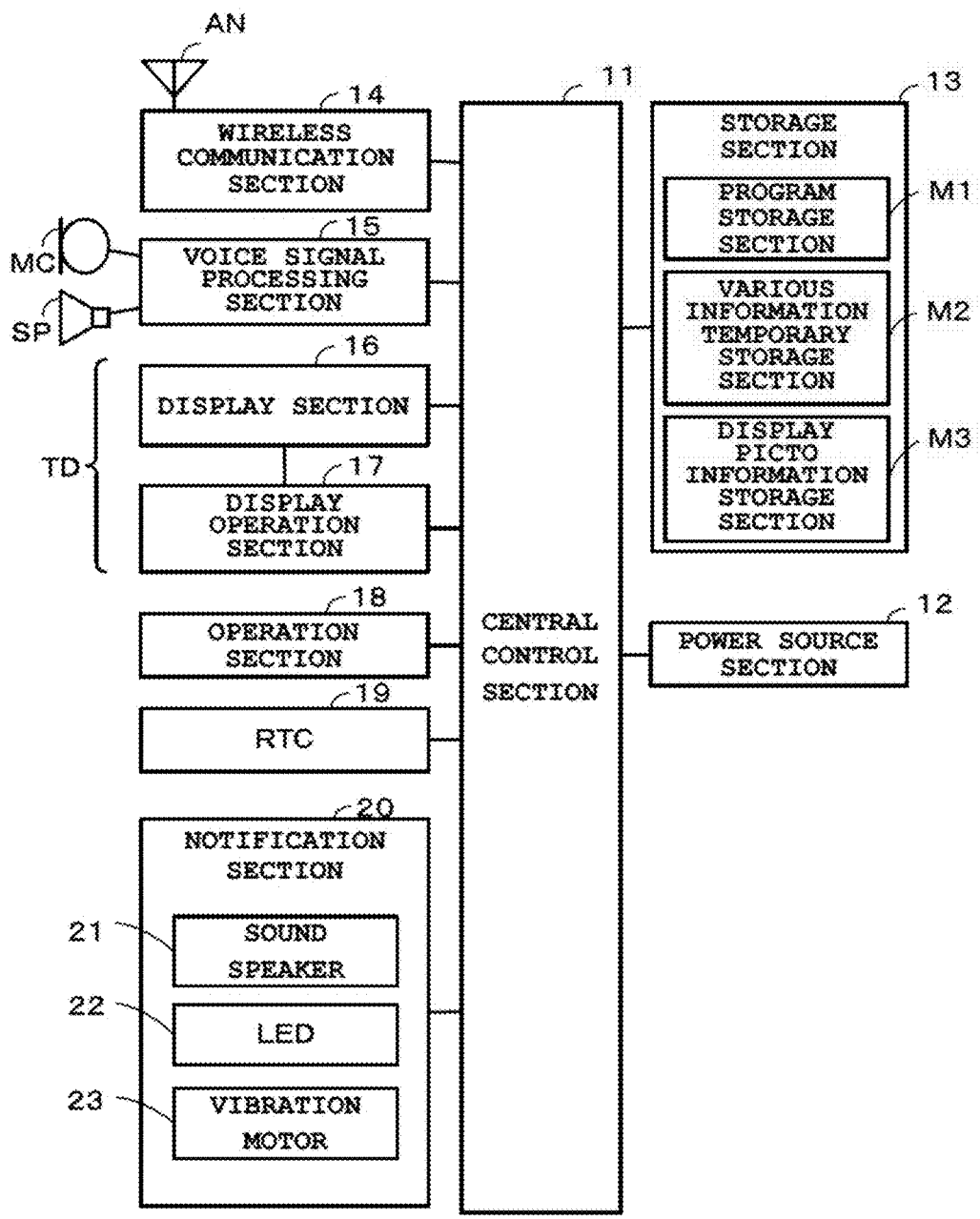
FIG. 2 is a block diagram depicting a basic component of the mobile phone 1.

FIG. 2 is a block diagram depicting a basic component of the mobile phone 1.

A central control section 11 operates by electric power supply from a power source section 12 that includes a secondary battery, and includes a memory and a central processing unit (not illustrated) that controls the entire operation of the mobile phone 1 in accordance with various programs in a storage section 13. In the storage section 13, a program storage section M1, a various information temporary storage section M2, and a display picto information storage section M3 are provided. In the program storage section M1, a program and various applications that are used to realize the embodiments in accordance with operation procedures illustrated in FIG. 5 to FIG. 9 are stored, and information that is required for the realization is also stored. Note that the storage section 13 may include, for example, a removable portable memory (external storage medium) such as an SD card and an IC card, and may include a storage area on a certain external server that is not illustrated. In addition, the various information temporary storage section M2 is a work area that temporarily stores various pieces of information such as flag information and screen information that are required to operate the mobile phone 1. Note that the display picto information storage section M3 will be described in detail later.

A wireless communication section 14 transmits and receives data to and from the nearest base station 2A at the time of operation of the calling function, the electronic mail function, the Internet connection function, and the like. At the time of operation of the calling function, the wireless communication section 14 captures a signal from the reception side of a baseband section, demodulates the captured signal into a reception baseband signal and outputs the demodulated signal to the central control section 11, and then the central control section 11 performs output of audio from a call speaker SP through an audio signal processing section 15, and whereas the central control section 11 loads audio data inputted from a call microphone MC through the audio signal processing section 15, encodes the audio data into a transmission baseband signal, and then sends the encoded transmission baseband signal to the transmission side of the baseband section to output the signal through an antenna AN.

The display section 16 uses a high definition liquid crystal or an organic EL, and displays, for example, various pieces of information such as character information, a standby image, a display picto (pictogram: pictographic character and the like), and a function icon, and a display operation section 17 that includes a transparent contact sensor that detects contact of an object such as a finger and instrument is arranged to be layered on the surface of the display panel, whereby the display section 16 and display operation section 17 constitute the touch screen TD. The display operation section 17 detects an operation to the display section 16, and, when the contact operation (touch operation) to the display section 16 is performed, the display operation section 17 detects contact to the display section 16 as a touch operation and delivers the detection result to the central control section 11.

In addition, the display operation section 17 can detect pushing (pressing) of operating instrument and a finger in addition to the contact detection by the contact sensor, and the central control section 11 detects presence or absence of a touch operation and a pressing operation on the basis of an input operation signal from the display operation section 17, and detects the operation position (touch position). Note that the embodiment is not limited to the case where the whole surface of the display section 16 corresponds to the touch screen TD, but can be applied to a case where a part of the whole surface of the display section 16 corresponds to the touch screen TD. In addition, the structure included in the display operation section 17 is not limited to the transparent contact sensor, but may be a noncontact sensor that detects movement of an object present at a close distance by capacitance.

An operation section 18 includes various press button type keys such as a power source button, and the central control section 11 executes processing in accordance with an input operation signal. An RTC (Real Time Clock module) 19 constitutes a clock section, and the central control section 11 acquires current date and time from the RTC 19. A notification section 20 includes a sound speaker 21, an LED (light emitting diode) 22, and a vibration motor 23, and is driven to perform incoming call notification at the time of an incoming call, and is driven at the time of alarm notification.

FIG. 3 is a diagram illustrating the display picto information storage section M3.

The display picto information storage section M3 stores, for each picto, information on the display picto that is displayed on the display section 16, and includes items of "picto ID", "name", "image data", "operation target flag", and "picto function". "Picto ID" and "name" are pieces of information that are used to identify a picto, and "image data" is actual data (image data) of a picto such as a pictographic character. "Operation target flag" is a flag that indicates whether or not an operation to a display picto has been performed in order to execute a function that corresponds to the display picto, and "1" indicates that an operation to a display picto has been performed. In "picto function", when "name" is a radio wave picto, "radio wave off setting for blocking radio waves" is stored; when "name" is a battery picto, "remaining battery details display" and "power saving setting for saving power consumption" are stored; and when "name" is a mail picto, "newly arrived mail display" is stored as a picto function.

Figure 4:
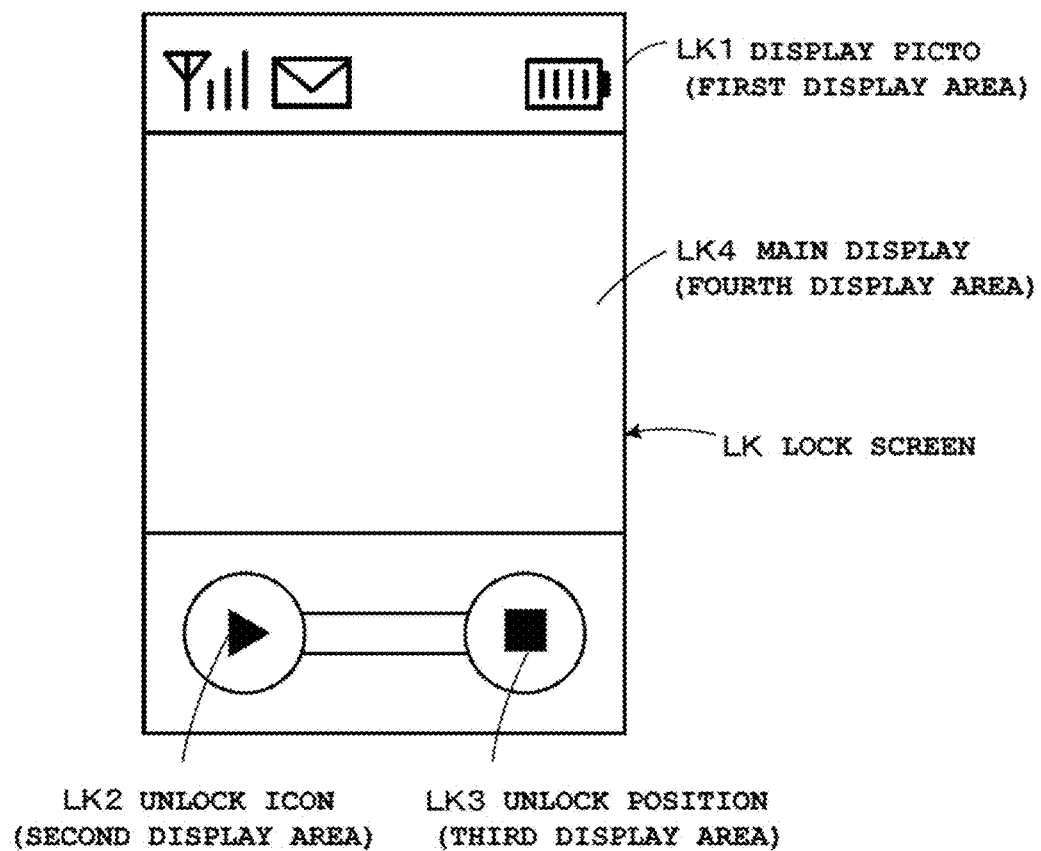
FIG. 4 is a diagram illustrating a lock screen for preventing an erroneous operation to a display section 16.

FIG. 4 is a diagram illustrating the lock screen that prevents an erroneous operation to the display section 16.

A lock screen LK for preventing an erroneous operation, which is displayed on the display section 16, includes a display area (first display area) LK1 of a display picto and a display area (second display area) LK2 of an unlock icon. In addition, the lock screen LK includes an unlock position display area (third display area) LK3 that displays an unlock position when unlock is performed by performing an operation to move the unlock icon (black triangle mark in FIG. 4) to a predetermined position (end mark: display position of a black square mark in FIG. 4) and another primary (main) display area (fourth display area) LK4. Note that, in the lock screen LK, image data such as a wall paper may be displayed on the fourth display area LK4, and the display layout in the lock screen LK is not limited to the illustrated example, and may be arbitrary.

Next, an operation concept of the mobile phone according to the first embodiment will be described below with reference to the flowcharts illustrated in FIG. 5 to FIG. 9. Here, each function illustrated in these flowcharts is stored in a readable program code format, and operations are sequentially executed in accordance with the program codes. FIG. 10 is a diagram illustrating a case in which a predetermined operation other than the unlock operation is judged as a display picto function execution operation, and a function that corresponds to the display picto is executed.

Figure 5:
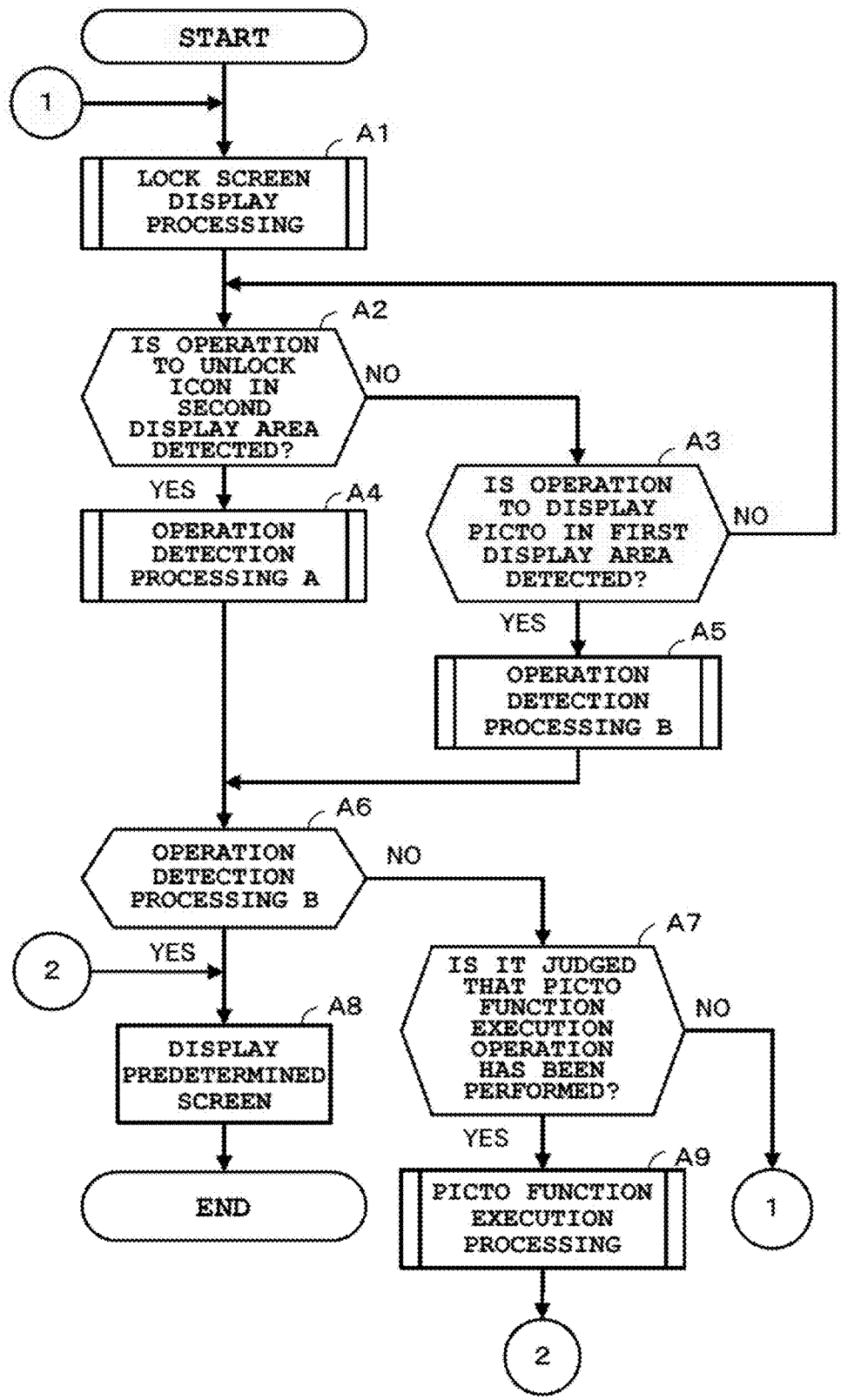
FIG. 5 is a flowchart (main flow) depicting an operation that is executed and started when a shift to a lock screen is instructed.

FIG. 5 is a flowchart (main flow) depicting an operation that is executed and started when an instruction of a shift to the lock screen that prevents an erroneous operation to the display section 16 is performed, and when the processing exits from the flow of FIG. 5, the processing returns to the main flow of the entire operation (not illustrated). First, the central control section 11 performs lock screen display processing to display the lock screen on the display section 16 in response to the instruction of the shift to the lock screen (Step A1). Note that the instruction of the shift to the lock screen is not limited to a manual instruction and may be an automatic instruction.

Figure 6:
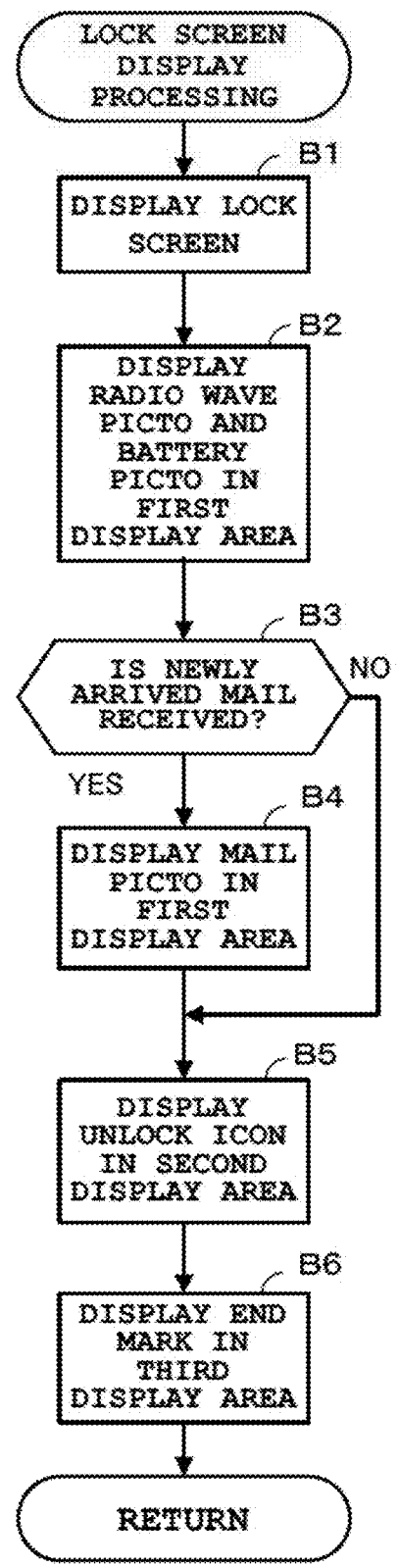
FIG. 6 is a flowchart for describing in detail lock screen display processing (Step A1 in FIG. 5).

FIG. 6 is a flowchart for describing in detail the lock screen display processing (Step A1 in FIG. 5).

First, the central control section 11 displays the lock screen LK on the display section 16 (Step B1 in FIG. 6), and then displays a radio wave picto and a battery picto on the first display area LK1, which is a display area of the display picto (Step B2). In addition, the central control section 11 checks whether or not a newly arrived mail has been received (Step B3), and, when a newly arrived mail has been received (YES in Step B3), the central control section 11 displays a mail picto on the first display area LK1 (Step B4). Next, the central control section 11 displays the unlock icon (black triangle mark in FIG. 4) in the second display area LK2, which a display area of the unlock icon (Step B5), and displays the end mark (black square mark in FIG. 4) in the third display area LK3, which a display area of the unlock position (Step B6).

As a result of this, the lock screen display processing (Step A1 in FIG. 5) ends, and then the central control section 11 checks whether or not an operation to the unlock icon in the second display area LK2 has been detected (Step A2), and checks whether or not an operation to the display picto in the first display area LK1 has been detected (Step A3). Here, when an operation to the unlock icon is detected (YES in Step A2), the processing proceeds to execution of operation detection processing A for judging an operation executed subsequent to the operation to the unlock icon, which is a starting point (Step A4). In addition, when an operation to the display picto is detected (YES in Step A3), the processing proceeds to execution of operation detection processing B for judging an operation executed subsequent to the operation to the display picto, which is a starting point (Step A5).

Figure 7:
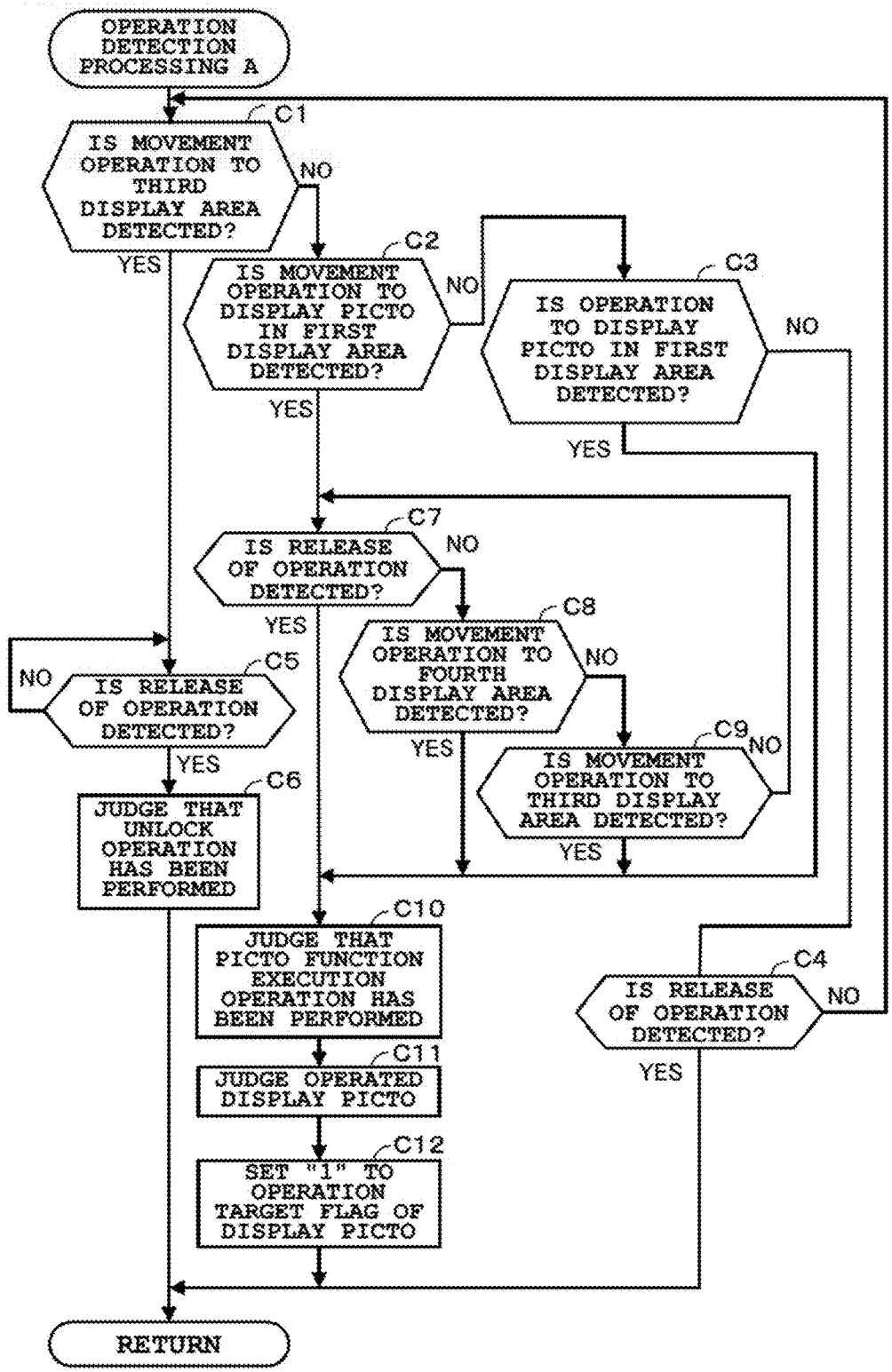
FIG. 7 is a flowchart for describing in detail operation detection processing A (Step A4 in FIG. 5).

FIG. 7 is a flowchart for describing in detail the operation detection processing A (Step A4 in FIG. 5).

First, the central control section 11 detects an operation to the unlock icon, and then checks an operation that has been performed as a next operation (Step C1 to Step C4). That is, the central control section 11 checks whether or not a movement operation (slide operation) to the third display area LK3 has been detected (Step C1), checks whether or not a movement operation to any display picto in the first display area LK1 has been detected (Step C2), and checks whether or not an operation to any display picto (predetermined operation other than the movement operation) in the first display area LK1 has been detected (Step C3).

Here, when any one of the above-described operations is not detected (NO in Step C1 to Step C3), the processing proceeds to a subsequent Step C4, and the central control section 11 checks whether or not release of the operation to the unlock icon is detected, and, when release of the operation has not been detected, either (NO in Step C4), the processing returns to the above-described Step C1, and whereas, when release of the operation to the unlock icon is detected (YES in Step C4), the processing exits from the flow of FIG. 7 in order to cancel the operation to the unlock icon. On the other hand, when the operation to the unlock icon is performed and then the central control section 11 detects a movement operation (slide operation) to move the unlock icon to the third display area LK3 (YES in Step C1), the processing waits until the operation in the third display area LK3 is released (Step C5). Here, when release of the operation in third display area LK3 is detected (YES in Step C5), the central control section 11 judges that a predetermined unlock operation is performed (Step C6). After that, the processing exits from the flow of FIG. 7.

In addition, when an operation to the unlock icon is performed and then the central control section 11 detects an operation to any display picto (predetermined operation other than a movement operation) in the first display area LK1 (YES in Step C3), the central control section 11 judges that an operation to instruct execution of the picto function has been performed (Step C10), and judges the type of the operated display picto (Step C11). For example, as illustrated FIG. 10 (1), when an operation to the unlock icon (for example, a single touch operation) in the second display area LK2 and an operation to the radio wave picto (for example, a single touch operation) in the first display area LK1 are performed at the same timing or at different timings, the central control section 11 judges that an operation to instruct execution of the radio wave picto function has been performed. The central control section 11 then sets "1" to "operation target flag" in the display picto information storage section M3, which corresponds to the display picto (Step C12). After that, the processing exits from the flow of FIG. 7.

On the other hand, when the operation to an unlock icon is performed and then the central control section 11 detects a movement operation (slide operation) to move the unlock icon to any display picto in the first display area LK1 (YES in Step C2), the central control section 11 checks whether or not release of the operation at the position of the display picto has been detected (Step C7), checks whether or not a movement operation from the first display area LK1 to the fourth display area LK4, which is a main display area, has been detected (Step C8), and checks whether or not a movement operation from the first display area LK1 to the third display area LK3 has been detected (Step C9).

Here, when release of the operation is detected at the position of any display picto (YES in Step C7), the central control section 11 judges that an operation to instruct execution of the picto function has been performed (Step C10), and judges the type of the operated display picto (Step C11). For example, as illustrated in FIG. 10 (2), when the unlock icon in the second display area LK2 is touched and then a movement operation to the radio wave picto in the first display area LK1 is performed, the central control section 11 judges that an operation to instruct execution of the radio wave picto function has been performed.

In addition, when the central control section 11 detects a movement operation to any display picto in the first display area LK1 (YES in Step C2), and then further detects a movement operation from the first display area LK1 to the fourth display area LK4 (YES in Step C8), the central control section 11 judges that an operation to instruct execution of the picto function has been performed (Step C10), and judges the type of the operated display picto (Step C11). Similarly, when the central control section 11 detects a movement operation to any display picto in the first display area LK1 (YES in Step C2), and then further detects a movement operation from the first display area LK1 to the third display area LK3 (YES in Step C9), the central control section 11 judges that an operation to instruct execution of the picto function has been performed (Step C10), and judges the type of the operated display picto (Step C11).

Figure 8:
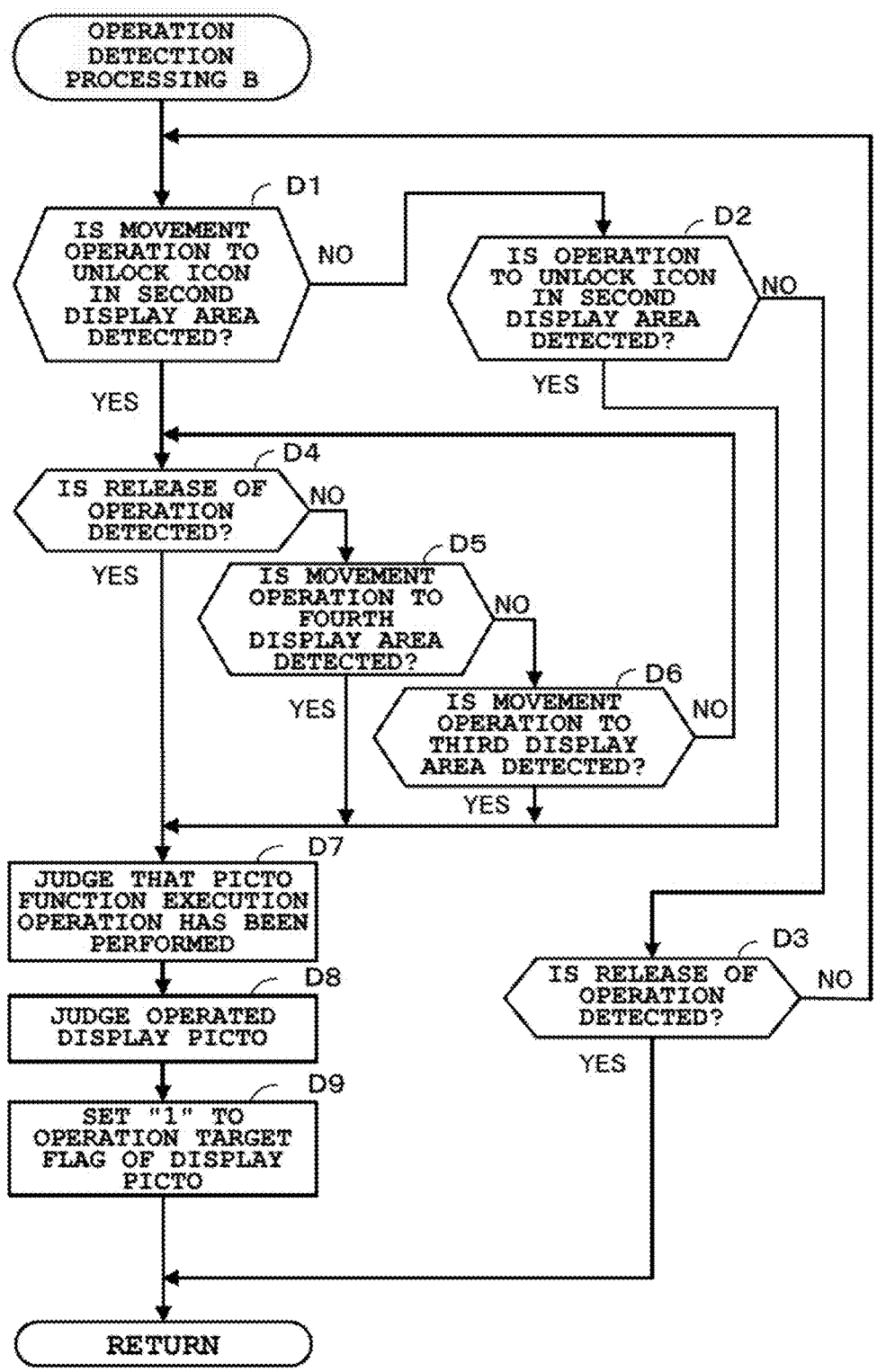
FIG. 8 is a flowchart for describing in detail operation detection processing B (Step A5 in FIG. 5).

FIG. 8 is a flowchart for describing in detail the operation detection processing B (Step A5 in FIG. 5).

First, after an operation to a display picto is performed, the central control section 11 checks whether or not a movement operation to the unlock icon in the second display area LK2 has been detected (Step D1), and checks whether or not an operation to the unlock icon (predetermined operation other than the movement operation) in the second display area LK2 has been detected (Step D2). Here, when any one of the above-described operations is not detected (NO in Step D1 and Step D2), the central control section 11 checks whether or not release of the operation to the display picto has been detected (Step D3).

Here, when release of the operation to the display picto is not detected, either (NO in Step D3), the processing returns to the above-described Step D1, and whereas, when release of the operation is detected (YES in Step D3), the processing exits from the flow of FIG. 8. On the other hand, when an operation to a display picto is performed and then the central control section 11 detects an operation to move the display picto to the unlock icon in the second display area LK2 (YES in Step D1), the central control section 11 checks whether or not release of the operation has been detected at the position of the unlock icon (Step D4), checks whether or not a movement operation from the second display area LK2 to the fourth display area LK4, which is the main display area, has been detected (Step D5), and checks whether or not a movement operation from the second display area LK2 to the third display area LK3 has been detected (Step D6).

Here, when release of the operation in the second display area LK2 is detected (YES in Step D4), the central control section 11 judges that an operation to instruct execution of the picto function has been performed (Step D7), and judges the type of the operated display picto (Step D8). In addition, when the central control section 11 detects a movement operation to the unlock icon (YES in Step D1), and then further detects a movement operation to the fourth display area LK4 (YES in Step D5), the central control section 11 also judges that an operation to instruct execution of the picto function has been performed (Step D7), and judges the type of the operated display picto (Step D8). Similarly, when the central control section 11 detects a movement operation to the unlock icon (YES in Step D1), and then further detects a movement operation to the third display area LK3 (YES in Step D6), the central control section 11 also judges that an operation to instruct execution of the picto function has been performed (Step D7), and judges the type of the operated display picto (Step D8). The central control section 11 sets "1" to "operation target flag" in the display picto information storage section M3, which corresponds to the display picto (Step D9), and then the processing exits from the flow of FIG. 8.

When the operation detection processing A (Step A4 in FIG. 5) or the operation detection processing B (Step A5 in FIG. 5) ends as described above, the central control section 11 checks a judgment result in the above-described operation detection processing A or operation detection processing B (Step A6 or Step A7). That is, the central control section 11 checks whether or not it is judged that an unlock operation has been performed (Step A6), or whether or not it is judged that an operation to instruct execution of a picto function has been performed (Step A7). Here, when the unlock operation is performed (YES in Step A6), the central control section 11 displays a predetermined screen (for example, a home screen or a menu screen) in order to unlock the lock screen (Step A8), and whereas, when an operation to instruct execution of the picto function is performed (YES in Step A7), the central control section 11 executes picto function execution processing that is described later (Step A9), and then the processing proceeds to Step A8 to display the predetermined screen. In addition, when the central control section 11 does not judge that the unlock operation and the picto function execution operation are performed (NO in Steps A6 and A7), the processing returns to the initial Step A1. Note that, after the picto function execution processing, the processing may return to the initial Step A1 without unlock of the lock screen in order to keep the lock screen.

Figure 9:
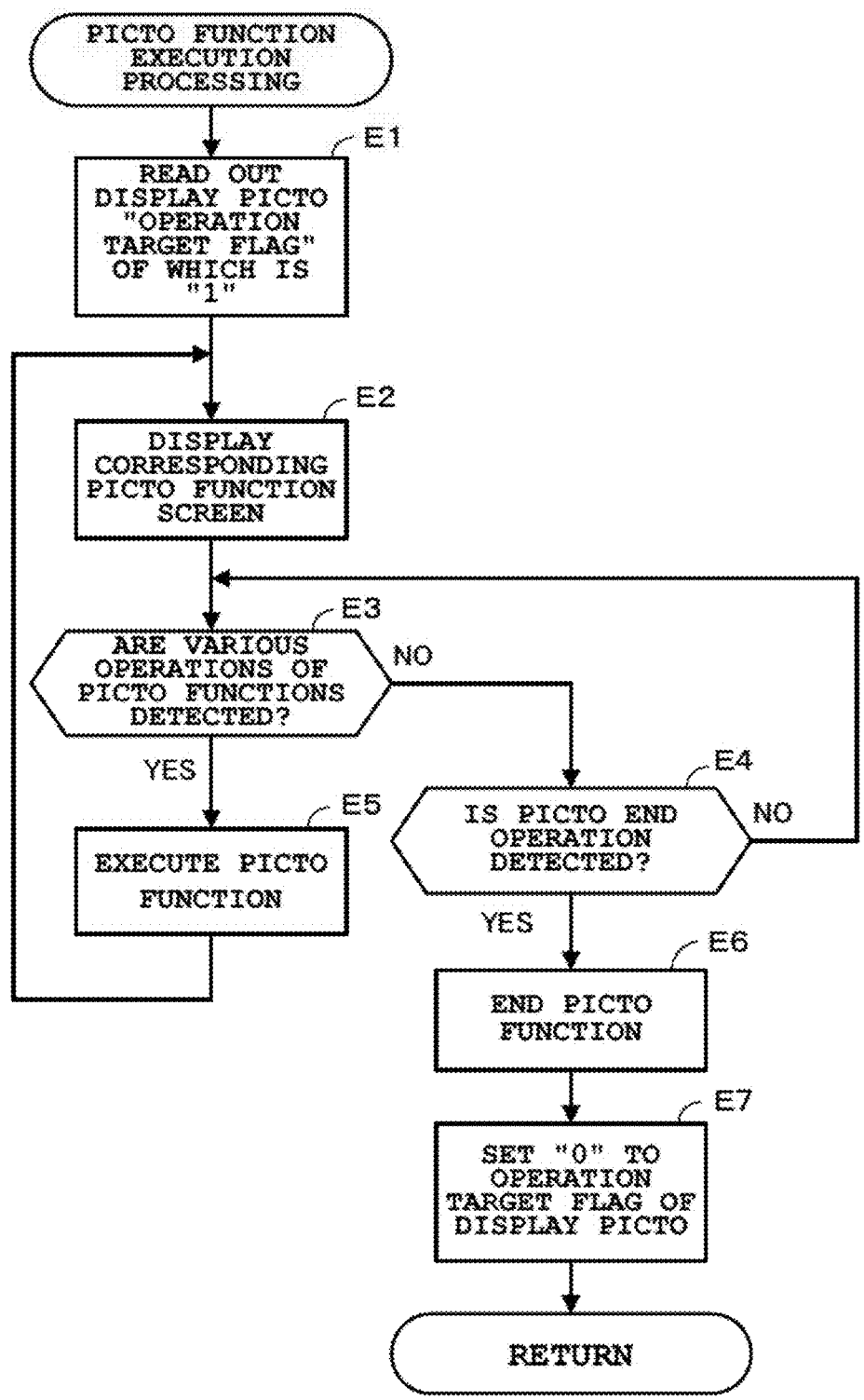
FIG. 9 is a flowchart for describing in detail picto function execution processing (Step A9 in FIG. 5).

FIG. 9 is a flowchart for describing in detail the picto function execution processing (Step A9 in FIG. 5).

First, the central control section 11 reads out a display picto "operation target flag" of which corresponds to "1", with reference to the display picto information storage section M3 (Step E1), and displays a picto function screen that corresponds to the read-out display picto (Step E2). For example, as the picto function screen, the central control section 11 displays a radio wave off setting screen, a selection menu screen of remaining battery detail display and power saving setting, and a newly arrived mail display screen. FIG. 10 (3) illustrates the radio wave off setting screen that is displayed in response to the operation of FIG. 10 (1) or (2).

In the state where the picto function screen is displayed as described above, the central control section 11 checks whether or not various operations of the picto functions have been detected (Step E3), and checks whether or not a picto end operation has been detected (Step E4). Here, when the central control section 11 detects an on/off setting operation, a selection operation of a selection menu, a scroll operation of a newly arrived mail, or the like, as an operation that corresponds to the displayed picto function screen (YES in Step E3), the picto function is executed in response to the operation (Step E5), and then the processing returns to the above-described Step E2. For example, in the radio wave off setting screen as illustrated in FIG. 10 (3), when a check mark is applied to one of items of "set radio waves off" and "set radio waves not off" through a user operation, a picto function in accordance with the operation is executed. In addition, when the picto end operation is detected (YES in Step E4), the central control section 11 ends the picto function (Step E6). The central control section 11 then sets "0" to "operation target flag" that corresponds to the display picto (Step E7). After that, the processing exits from the flow of FIG. 9.

As described above, the central control section 11 according to the first embodiment judges that the display picto function execution operation has been performed and executes a function that corresponds to the display picto when an operation to the display section 16 other than the unlock operation is detected in the state where a display picto is displayed on the first display area in the lock screen for preventing an erroneous operation to the display section 16 and the unlock icon is displayed on the second display area, so that the function that corresponds to the display picto can be easily executed without unlock of the lock screen, and the user can execute the function that corresponds to the display picto through a predetermined operation other than the unlock operation, and it becomes rich in the operability and the convenience for the user.

When an operation to the unlock icon is detected as an operation other than the unlock operation, the central control section 11 judges that the display picto function execution operation has been performed, so that the operation to the unlock icon can corresponds to the display picto function execution operation, and, in this case, the possibility of an erroneous operation is not increased because of the operation to the unlock icon.

When an operation to the unlock icon in the second display area LK2 and an operation to a display picto in the first display area LK1 are detected, the central control section 11 judges that the display picto function execution operation has been performed. Accordingly, the user can easily execute a function that corresponds to the display picto displayed on the lock screen merely by performing the operation to the unlock icon and the operation to the display picto, for example, merely by performing an operation to touch the unlock icon and the display picto at the same timing. In addition, the possibility of an erroneous operation is not increased because of the operation to the unlock icon and the operation to the display picto. Moreover, a function that corresponds to the display picto can be executed by an intuitive operation because of the operation to the display picto. Furthermore, the intentions of a user recognizing the lock screen and still executing a function that corresponds to the display picto even for the lock screen can be achieved by the intuitive operation (operation to the unlock icon and operation to the display picto).

When the central control section 11 detects an operation to the unlock icon in the second display area LK2 and then detects an operation to move the unlock icon from the second display area LK2 to the first display area LK1 for the display picto, the central control section 11 judges that the display picto function execution operation has been performed. Accordingly, the user can easily execute a function that corresponds to the display picto merely by performing the operation to move the unlock icon to the display picto. In addition, the possibility of an erroneous operation is not increased because of the operation to the unlock icon. Moreover, the function that corresponds to the display picto can be executed by an intuitive operation because of the operation to the display picto.

When the central control section 11 detects an operation to the unlock icon in the second display area LK2, then detects an operation to move the unlock icon from the second display area LK2 to the first display area LK1, and further does not detect the operation to the unlock icon anymore, the central control section 11 judges that the display picto function execution operation has been performed. Accordingly, the user can easily execute a function that corresponds to a display picto displayed on the lock screen by performing operation to the unlock icon, then performing the operation to move the unlock icon from the second display area to the first display area, and further stopping the operation to the unlock icon. In addition, the possibility of an erroneous operation is not increased because of the operation to the unlock icon. Moreover, the function that corresponds to the display picto can be executed by an intuitive operation because of the operation to the display picto.

When the central control section 11 detects an operation to the unlock icon in the second display area LK2, then detects an operation to move the unlock icon from the second display area LK2 to the first display area LK1, and further detects an operation to move the unlock icon to the fourth display area LK4, which is the main display area, the central control section 11 judges that the display picto function execution operation has been performed. Accordingly, the user can instruct the picto function screen to be displayed on the fourth display area LK4 by a path of the movement operation, from the second display area LK2 through the first display area LK1 to the fourth display area LK4. In addition, the possibility of an erroneous operation is not increased because of the operation to the unlock icon. Moreover, the function that corresponds to the display picto can be executed by an intuitive operation because of the operation to the display picto.

When the central control section 11 detects an operation to the unlock icon in the second display area LK2, then detects an operation to move the unlock icon from the second display area LK2 to the first display area LK1, and further detects an operation to move the unlock icon to the third display area LK3, the central control section 11 judges that the display picto function execution operation has been performed. Accordingly, for the user, an operation acquired by adding an operation to pass through a display picto to the unlock operation can correspond to the display picto function execution operation, and it becomes easy for the user to understand the operation. In addition, the possibility of an erroneous operation is not increased because of the operation to the unlock icon. Moreover, the function that corresponds to the display picto can be executed by an intuitive operation because of the operation to the display picto.

When the central control section 11 detects an operation to a display picto in the first display area LK1 and then detects an operation to move the display picto from the first display area LK1 to the second display area LK2, the central control section 11 judges that the display picto function execution operation has been performed. Accordingly, the user can easily execute a function that corresponds to the display picto displayed on the lock screen by the operation to the display picto and the movement operation to the unlock icon. In addition, the possibility of an erroneous operation is not increased because of the operation to the unlock icon. Moreover, the function that corresponds to the display picto can be executed by an intuitive operation because of the operation to the display picto. Furthermore, the intentions of a user recognizing the lock screen and still executing the function that corresponds to the display picto even for the lock screen can be achieved by the intuitive operation (operation to the display picto and operation to the unlock icon).

When the central control section 11 detects an operation to a display picto in the first display area LK1, then detects an operation to move the display picto from the first display area LK1 to the second display area LK2, and further does not detect the operation to the display picto anymore, the central control section 11 judges that the display picto function execution operation has been performed. Accordingly, the user can easily execute a function that corresponds to the display picto displayed on the lock screen by performing the operation to the display picto, then performing the operation to move the display picto from the first display area to the second display area, and further stopping the operation to the unlock icon. In addition, the possibility of an erroneous operation is not increased because of the operation to the unlock icon. Moreover, the function that corresponds to the display picto can be executed by an intuitive operation because of the operation to the display picto.

When the central control section 11 detects an operation to a display picto in the first display area LK1, then detects an operation to move the display picto from the first display area LK1 to the second display area LK2, and further detects an operation to move the display picto to the fourth display area LK4, which is the main display area, the central control section 11 judges that the display picto function execution operation has been performed. Accordingly, the user can easily execute a function that corresponds to the display picto displayed on the lock screen by performing the operation to the display picto, then performing the operation to move the display picto from the first display area LK1 to the second display area LK2, and further performing the operation to move the display picto to the fourth display area LK4. In addition, the possibility of an erroneous operation is not increased because of the operation to the unlock icon. Moreover, the function that corresponds to the display picto can be executed by an intuitive operation because of the operation to the display picto.

When the central control section 11 detects an operation to a display picto in the first display area LK1, then detects an operation to move the display picto from the first display area LK1 to the second display area LK2, and further detects an operation to move the display picto to the third display area LK3, the central control section 11 judges that the display picto function execution operation has been performed. Accordingly, the user can easily execute a function that corresponds to the display picto displayed on the lock screen by performing the operation to the display picto, then performing the operation to move the display picto from the first display area LK1 to the second display area LK2, and further performing the operation to move the display picto to the third display area LK3. In addition, the possibility of an erroneous operation is not increased because of the operation to the unlock icon. Moreover, the function that corresponds to the display picto can be executed by an intuitive operation because of the operation to the display picto.

When a plurality of display pictos are displayed on the first display area LK1, a function that corresponds to a display picto that has been operated from among the plurality of display pictos is executed. Accordingly, the user can easily execute the function that corresponds to the display picto by the operation to the display picto that corresponds to the function that the user wants to execute.

Second Embodiment

A second embodiment of the present invention will be described below with reference to FIG. 11 and FIG. 12.

Note that, in the first embodiment, a predetermined operation other than the unlock operation is judged as the display picto function execution operation, and whereas, in the second embodiment, an operation acquired by adding a predetermined operation to the unlock operation is judged as the display picto function execution operation. Note that sections that are basically the same or have the same name in both embodiments are given the same reference numerals, and therefore explanations thereof are omitted. Hereafter, the characteristic portion of the second embodiment will mainly be described.

Figure 11:
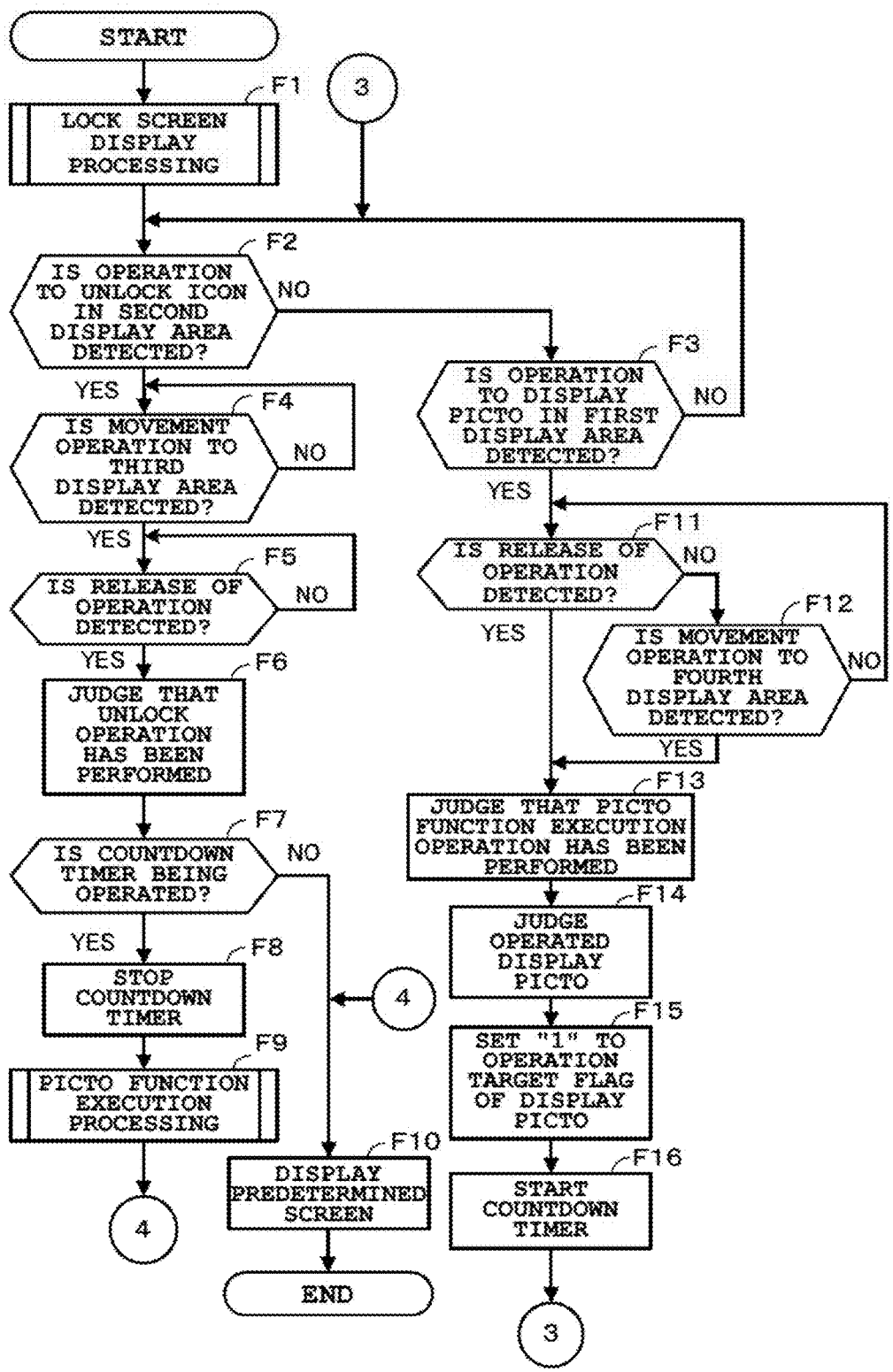
FIG. 11 is a flowchart (main flow) depicting an operation that is executed and started when a shift to the lock screen is instructed in a second embodiment.

FIG. 11 is a flowchart (main flow) depicting an operation that is executed and started when a shift to the lock screen that prevents an erroneous operation to the display section 16 is instructed in the second embodiment. When the processing exits from the flow of FIG. 11, the processing returns to the main flow of the entire operation (not illustrated). FIG. 12 is a diagram illustrating a case in which an operation acquired by adding a predetermined operation to the unlock operation is judged as the display picto function execution operation, and, when an operation to the display picto in the first display area LK1 is performed and then the unlock operation is performed within a predetermined time period, a function that corresponds to a display picto is executed.

First, when a shift to the lock screen is instructed, the central control section 11 performs the lock screen display processing to display the lock screen on the display section 16 (Step F1). Note that the lock screen display processing is executed in accordance with the above-described flow of FIG. 6, so that the explanations are omitted. When the lock screen display processing ends, the central control section 11 checks whether or not an operation to the unlock icon in the second display area LK2 has been detected (Step F2), and checks whether or not an operation to the display picto in the first display area LK1 has been detected (Step F3).

Here, when an operation to the unlock icon is detected (YES in Step F2), the processing waits until a movement operation (slide operation) to move the unlock icon to the third display area LK3 is detected (Step F4). Here, when the movement operation to the third display area LK3 is detected (YES in Step F4), the central control section 11 checks whether or not the operation has been released in the third display area LK3 (Step F5). When the operation is released (YES in Step F5), the central control section 11 judges that the predetermined unlock operation has been performed (Step F6). In addition, the central control section 11 checks whether or not a countdown timer (not illustrated), which is described later, is being operated (Step F7), and here, the timer is not being operated (NO in Step F7), so that switching to a predetermined screen (for example, a home screen or a menu screen) is performed and the predetermined screen is displayed in order to unlock the lock screen (Step F10).

On the other hand, when an operation to any display picto in the first display area LK1 is detected (YES in Step F3), the central control section 11 checks whether or not release of the operation has been detected at the position of the display picto (Step F11), and checks whether or not a movement operation to move the display picto to the fourth display area LK4, which is the main display area, has been detected (Step F12). FIG. 12 (1) illustrates a case in which an operation to the battery picto in the first display area LK1 is performed and then an operation to move a battery picto in the first display area LK1 to the fourth display area LK4, which is the main display area, is performed.

Here, when release of the operation in the display picto is detected (YES in Step F11), or when a movement operation to the fourth display area LK4 is detected (YES in Step F12), the central control section 11 judges that an operation to instruct execution of the picto function has been performed (Step F13), and judges the type of the operated display picto (Step F14). In addition, the central control section 11 sets "1" to "operation target flag" that corresponds to the display picto in the display picto information storage section M3 (Step F15). After that, the central control section 11 starts a count operation in which an initial value (for example, five seconds) is set to the countdown timer and subtraction of the value is performed (Step F16). The countdown timer counts a time from the picto function execution operation to the unlock operation, and the processing returns to the above-described Step F2 after the count operation starts.

After such a picto function execution operation is performed, when the unlock operation is performed (Step F2 and Step F4 to Step F6), the central control section 11 checks whether or not the above-described countdown timer is being operated (Step F7). Here, FIG. 12 (2) illustrates the unlock operation after the picto function execution operation, and illustrates a case in which the unlock operation is performed within a predetermined time period (for example, five seconds) after the picto function execution operation is performed. When the unlock operation is performed within the predetermined time period as described above, the countdown timer is being operated (YES in Step F7), so that the central control section 11 stops the count operations of the countdown timer (Step F8), and then performs the picto function execution processing (Step F9) in accordance with the above-described flow of FIG. 9.

After that, the processing returns to Step F10, and the central control section 11 displays a predetermined screen. FIG. 12 (3) illustrates a case in which a screen that corresponds to the battery picto (screen of the remaining battery detail display and the power saving setting) is displayed as a screen that corresponds to a display picto when an operation to the display picto in the first display area LK1 as illustrated in FIG. 12 (1) is detected and then the unlock operation as illustrated in FIG. 12 (2) is performed within a predetermined time period. Note that, after the picto function execution processing, the processing may return to the initial Step F1 without unlock of the lock screen in order to keep the lock screen.

As described above, the central control section 11 according to the second embodiment judges that the display picto function execution operation has been performed when the central control section 11 detects an operation to a display picto in the first display area LK1 and then the unlock operation is performed within a predetermined time period. Accordingly, the user can easily execute a function that corresponds to the display picto displayed on the lock screen by performing the operation to the display picto in the first display area LK1 and then performing the unlock operation within the predetermined time period. In addition, the possibility of an erroneous operation is not increased because the unlock operation is performed before the display picto function is executed. Moreover, the user can execute the function that corresponds to the display picto by an intuitive operation because of the operation to the display picto. Furthermore, even when the user performs the operation to the display picto in the first display area LK1 in order to execute the display picto function, and then notices the lock screen because the display picto function is not executed, the display picto function is executed as long as the user performs the unlock operation within the predetermined time period. Accordingly, a special effect is acquired that the user does not feel inconvenience that the display picto function execution operation is needed to be performed again after the unlock operation is performed.

After the central control section 11 detects an operation to a display picto in the first display area LK1, and detects an operation to move the display picto from the first display area LK1 to the fourth display area LK4, when the unlock operation is performed within the predetermined time period, the central control section 11 judges that the display picto function execution operation has been performed. Accordingly, the user can easily execute a function that corresponds to the display picto displayed on the lock screen by performing the operation to the display picto and performing the operation to move the display picto from the first display area LK1 to fourth display area LK4, and then performing the unlock operation within the predetermined time period. In addition, the possibility of an erroneous operation is not increased because the unlock operation is performed before the display picto function is executed. Moreover, the user can execute the function that corresponds to the display picto by an intuitive operation because of the operation to the display picto. Furthermore, even when the user performs an operation to a display picto in the first display area LK1 and performs an operation to move the display picto from the first display area LK1 to the fourth display area LK4 in order to execute the display picto function, and then the user notices the lock screen because the display picto function is not executed, the display picto function is executed as long as the user performs the unlock operation within the predetermined time period. Accordingly, a special effect is acquired that the user does not feel inconvenience that the display picto function execution operation is needed to be performed again after the unlock operation is performed that the user wants to execute.

When a plurality of display pictos are displayed on the first display area LK1, a function that corresponds to a display picto that has been operated from among the plurality of display pictos is executed. Accordingly, the user can easily execute the function that corresponds to the display picto by the operation to the display picto that corresponds to the function that the user wants to execute.

In each of the above-described embodiments, the radio wave picto, the battery picto, and the mail picto are illustrated as a display picto, the embodiments are not limited to the example and are arbitrary. The function that corresponds to the display picto is also arbitrary, and for example, the function that corresponds to the radio wave picto may correspond to a given function that is related to the display picto such as a talk time display function.

In each of the above-described embodiments, the display section 16 is the display section that is provided in the terminal device, but the display section 16 may be a given external display device such as an external monitor.

In each of the above-described embodiments, the present invention is applied to a smartphone as the terminal device, buta PC (personal computer), a digital camera, a PDA (personal, portable information communication equipment), a tablet terminal device, a cellular phone apparatus other than a smartphone, an electronic game machine, a music player, or the like may be applied.

Furthermore, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

A part or all of the above-described embodiments can be described as described in the following Supplementary Notes, however, the embodiments are not limited to the Supplementary Notes. The whole part of the exemplary embodiments disclosed above can be described as the following Supplementary Notes.

(Supplementary Note 1)

Figure 13:
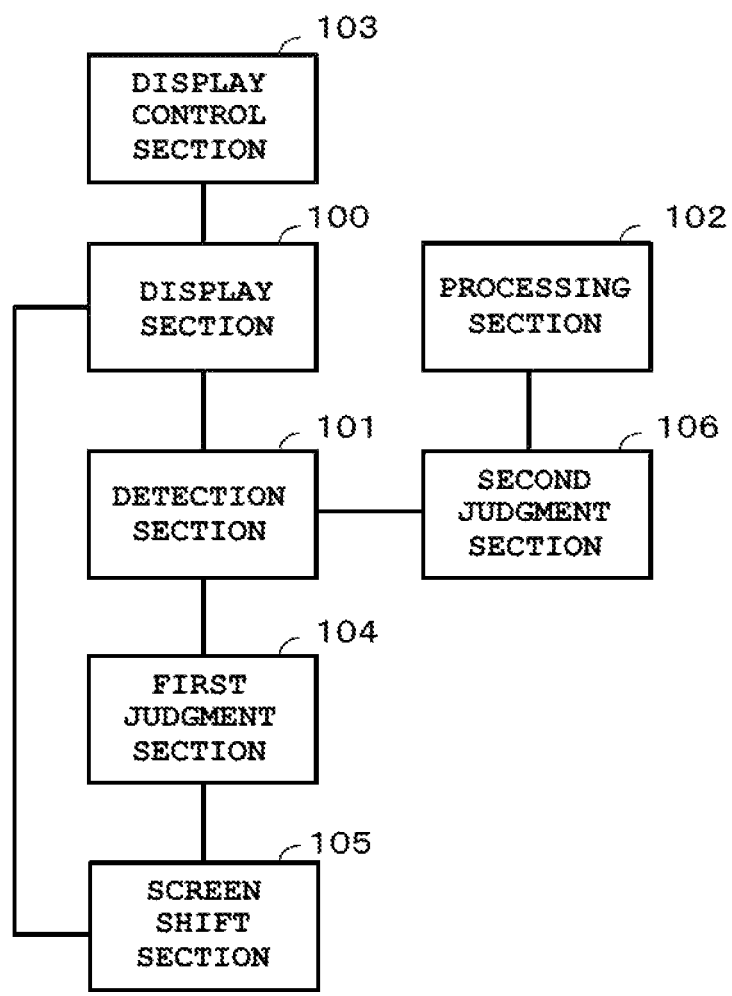
FIG. 13 is a functional block diagram illustrating a function of the present invention (invention according to Supplementary Note 1).

FIG. 13 is a configuration diagram (functional block diagram) according to Supplementary Note 1. As illustrated in FIG. 13, the invention described in Supplementary Note 1 is a terminal device (mobile phone 1 in FIG. 1) that includes a detection section 101 (display operation section 17, central control section 11, and storage section 13 in FIG. 2) for detecting an operation to a display section (display section 16 in FIG. 2) and a processing section 102 (central control section 11 and storage section 13 in FIG. 2) for executing processing in accordance with the operation detected by the detection section 101, and the terminal device comprising: a display control section 103 (central control section 11 and storage section 13 in FIG. 2) for displaying a display picto on a first display area in a lock screen for preventing an erroneous operation to the display section 100, and display an unlock icon on a second display area; a first judgment section 104 (central control section 11 and the storage section 13 in FIG. 2) for judging that an unlock operation has been performed when the detection section 101 detects an operation to the unlock icon in the second display are and then detects an operation to move the unlock icon from the second display area to a third display area; a screen shift section 105 (central control section 11 and storage section 13 in FIG. 2) for shifting the lock screen to a predetermined screen when the first judgment section 104 judges that the unlock operation has been performed; and a second judgment section 106 (central control section 11 and storage section 13 in FIG. 2) for judging that a display picto function execution operation has been performed when the detection section 101 detects a predetermined operation to the display section 100 other than the unlock operation, and wherein the processing section 102 executes a function that corresponds to the display picto displayed on the first display area when the second judgment section 106 judges that the display picto function execution operation has been performed.

(Supplementary Note 2)

The terminal device according to claim 1, wherein the second judgment section judges that the display picto function execution operation has been performed when the detection section detects a predetermined operation to the unlock icon, which is an operation other than the unlock operation.

(Supplementary Note 3)
The terminal device according to claim 2, wherein the second judgment section judges that the display picto function execution operation has been performed when the detection section detects an operation to the unlock icon in the second display area and an operation to the display picto in the first display area.

(Supplementary Note 4)
The terminal device according to claim 2, wherein the second judgment section judges that the display picto function execution operation has been performed when the detection section detects an operation to the unlock icon in the second display area and then detects an operation to move the unlock icon from the second display area to the first display area.

(Supplementary Note 5)
The terminal device according to claim 4, wherein the second judgment section judges that the display picto function execution operation has been performed when the detection section detects an operation to the unlock icon in the second display area, then detects an operation to move the unlock icon from the second display area to the first display area, and further does not detect an operation to the unlock icon anymore.

(Supplementary Note 6)
The terminal device according to claim 2, wherein the second judgment section judges that the display picto function execution operation has been performed when the detection section detects an operation to the display picto in the first display area and then detects an operation to move the display picto from the first display area to the second display area.

(Supplementary Note 7)
The terminal device according to claim 2, wherein the second judgment section judges that the display picto function execution operation has been performed when the detection section detects an operation to the display picto in the first display area and then the first judgment section judges that the unlock operation has been performed within a predetermined time period.

(Supplementary Note 8)
The terminal device according to claim 2, wherein the second judgment section judges that the display picto function execution operation has been performed when the detection section detects an operation to the display picto in the first display area, then the detection section detects an operation to move the display picto from the first display area to a fourth display area, and then the first judgment section judges that the unlock operation has been performed within a predetermined time period.

(Supplementary Note 9)
A processing method comprising:
a display control step of displaying a display picto on a first display area in a lock screen for preventing an erroneous operation to a display section, and displaying an unlock icon on a second display area;
a first judgment step of judging that an unlock operation has been performed when an operation to the unlock icon in the second display area is detected, and then an operation to move the unlock icon from the second display area to a third display area is detected;
a screen shift step of shifting the lock screen to a predetermined screen when judged that the unlock operation has been performed; a second judgment step of judging that a display picto function execution operation has been performed when a predetermined operation to the display section other than the unlock operation is detected; and
a processing step of executing a function that corresponds to the display picto displayed on the first display area when judged that the display picto function execution operation has been performed.

(Supplementary Note 10)
A non-transitory computer-readable storage medium having stored thereon a program that is executable by a computer of a terminal device to perform functions comprising:
a display control function for displaying a display picto on a first display area in a lock screen for preventing an erroneous operation to a display section, and display an unlock icon on a second display area;
a first judgment function for judging that an unlock operation has been performed when an operation to the unlock icon in the second display area is detected, and then an operation to move the unlock icon from the second display area to a third display area is detected;
a screen shift function for shifting the lock screen to a predetermined screen when judged that the unlock operation has been performed;
a second judgment function for judging that a display picto function execution operation has been performed when a predetermined operation to the display section other than the unlock operation is detected; and
a processing function for executing a function that corresponds to the display picto displayed on the first display area when judged that the display picto function execution operation has been performed.

(Supplementary Note 11)
The terminal device according to claim 4, wherein the second judgment section judges that the display picto function execution operation has been performed when the detection section detects an operation to the unlock icon in the second display area, then detects an operation to move the unlock icon from the second display area to the first display area, and further detects an operation to move the unlock icon to a fourth display area, which is a main display area.

(Supplementary Note 12)
The terminal device according to claim 4, wherein the second judgment section judges that the display picto function execution operation has been performed when the detection section detects an operation to the unlock icon in the second display area, then detects an operation to move the unlock icon from the second display area to the first display area, and further detects an operation to move the unlock icon to the third display area.

(Supplementary Note 13)
The terminal device according to claim 8, wherein the second judgment section judges that the display picto function execution operation has been performed when the detection section detects an operation to the display picto in the first display area, then detects an operation to move the display picto from the first display area to the second display area, and further does not detect an operation to the display picto anymore.

(Supplementary Note 14)
The terminal device according to claim 6, wherein the second judgment section judges that the display picto function execution operation has been performed when the detection section detects an operation to the display picto in the first display area, then detects an operation to move the display picto from the first display area to the second display area, and further detects an operation to move the display picto to a fourth display area, which is a main display area.

(Supplementary Note 15)

The terminal device according to claim 6, wherein the second judgment section judges that the display picto function execution operation has been performed when the detection section detects an operation to the display picto in the first display area, then detects an operation to move the display picto from the first display area to the second display area, and further detects an operation to move the display picto to the third display area.

(Supplementary Note 16)

The terminal device according to claim 3, wherein the display control section displays a plurality of display pictos on the first display area, wherein the terminal device further comprises a third judgment section for judging a display picto to which an operation is detected by the detection section from among the plurality of display pictos displayed by the display control section, and wherein the processing section executes a function that corresponds to the display picto judged by the third judgment section.

DESCRIPTION OF REFERENCE NUMERALS

1 MOBILE PHONE
11 CENTRAL CONTROL SECTION
13 STORAGE SECTION
16 DISPLAY SECTION
17 DISPLAY OPERATION SECTION
TD TOUCH SCREEN
LK LOCK SCREEN
LK1 FIRST DISPLAY AREA
LK2 SECOND DISPLAY AREA
LK3 THIRD DISPLAY AREA
LK4 FOURTH DISPLAY AREA
M1 PROGRAM STORAGE SECTION
M3 DISPLAY PICTO INFORMATION STORAGE SECTION

The invention claimed is:

1. A terminal device comprising:
a display section;
a touch panel that detects an operation to the display section;
a storage section that stores in advance one processing desired by a user from among a plurality of processings related to a display picto function corresponding to each of a plurality of display pictos, in association with the each of the plurality of display pictos to be displayed in a first display area of the display section, wherein the one processing stored in association with the each of the plurality of display pictos is a processing for displaying only a specific piece of information of the corresponding display picto function or a processing for displaying only a setting change screen for changing a specific setting; and
a central processing unit that
when a shift to a locked screen for preventing an erroneous operation to the display section is instructed, displays one of the display pictos on the first display area in the locked screen, displays an unlock icon on a second display area of the display section, and displays an icon indicating an unlock position on a third display area of the display section;
checks whether the touch panel detects an operation to the unlock icon in the second display area;
after the check has recognized an operation to the unlock icon in the second display area, first judges that an unlock operation has been performed when the touch panel detects a drag operation from the unlock icon in the second display area to the icon indicating the unlock position in the third display area;
shifts the locked screen to a predetermined screen when the first judges step determines that the unlock operation has been performed;
before the check has recognized an operation to the unlock icon in the second display area, second judges that a display picto function execution operation has been instructed when the touch panel detects an operation of selecting one of the display pictos in the first display area;
within a predetermined time period after the second judges step determines that the display picto function execution operation has been instructed, third judges that the display picto function execution operation has been performed when (i) the check recognizes an operation to the unlock icon in the second display area and (ii) the touch panel detects a drag operation from the unlock icon in the second display area to the icon indicating the unlock position in the third display area;
reads out, from the storage section, the one said processing stored in association with the display picto selected by the display picto function execution operation when the third judges step determines that the display picto function execution operation has been performed;
executes the read-out processing;
enables only an operation for performing the specific display or the specific setting change;
within a predetermined time period after the second judges step determines that the display picto function execution operation has been instructed, fourth judges that the display picto function execution operation has not been performed when (i) recognition of an operation to the unlock icon in the second display area by the check and (ii) detection of the drag operation from the unlock icon in the second display area to the icon indicating the unlock position in the third display area have not been performed; and
maintains the locked screen when the fourth judges step determines that the display picto function execution operation has not been performed.

2. The terminal device according to claim 1, wherein the second judges step also judges that the display picto function execution operation has been instructed when the touch panel detects an operation of selecting one of the display pictos in the first display are and then detects a drag operation from the selected one display picto to a fourth display area.

3. The terminal device according to claim 1, wherein, after the check has recognized an operation to the unlock icon in the second display area, the central processing unit fifth judges that the display picto function execution operation has been performed when the touch panel detects a drag operation from the unlock icon in the second display area to one of the display pictos in the first display area;
reads out, from the storage section, the one said processing stored in association with the display picto selected by the display picto function execution operation when the fifth judges step determines that the display picto function execution operation has been performed;
executes the read-out processing and
enables only an operation for performing the specific display or the specific setting change.

4. The terminal device according to claim 3, wherein, after the check has recognized an operation to the unlock icon in the second display area, the fifth judges step also judges that the display picto function execution operation has been performed when the touch panel detects a drag operation from the unlock icon in the second display area to one of the display pictos in the first display area, and further does not detect the drag operation anymore.

5. The terminal device according to claim 3, wherein, after the check has recognized an operation to the unlock icon in the second display area, the fifth judges step also judges that the display picto function execution operation has been performed when the touch panel detects a drag operation from the unlock icon in the second display area, via one of the display pictos in the first display area, to the icon indicating the unlock position in the third display area.

6. The terminal device according to claim 3, wherein, after the check has recognized an operation to the unlock icon in the second display area, the fifth judges step also judges that the display picto function execution operation has been performed when the touch panel detects a drag operation from the unlock icon in the second display area, via one of the display pictos in the first display area, to a fourth display area.

7. The terminal device according to claim 1, wherein, within a predetermined time period after the second judges step determines that the display picto function execution operation has been instructed, the third judges step also judges that the display picto function execution operation has been performed when (i) the check recognizes an operation to the unlock icon in the second display area and (ii) the touch panel detects a drag operation from the unlock icon in the second display area to a fourth display area.

8. A processing method comprising:
storing in a storage section of a terminal device in advance one processing desired by a user from among a plurality of processings related to a display picto function corresponding to each of a plurality of display pictos, in association with the each of the plurality of display pictos to be displayed in a first display area of a display section of the terminal device, wherein the one processing stored in association with the each of the plurality of display pictos is a processing of displaying only a specific piece of information of the corresponding display picto function or a processing of displaying only a setting change screen for changing a specific setting;
when a shift to a locked screen for preventing an erroneous operation to the display section is instructed, displaying one of the display pictos on the first display area in the locked screen, displaying an unlock icon on a second display area of the display section, and displaying an icon indicating an unlock position on a third display area of the display section;
checking whether an operation to the unlock icon in the second display area is detected;
after the checking step has recognized an operation to the unlock icon in the second display area, first judging that an unlock operation has been performed when a drag operation from the unlock icon in the second display area to the icon indicating the unlock position in the third display area is detected;
shifting the locked screen to a predetermined screen when the first judging step determines that the unlock operation has been performed;
before the check has recognized an operation to the unlock icon in the second display area, second judging that a display picto function execution operation has been instructed when an operation of selecting one of the display pictos in the first display area is detected;
within a predetermined time period after the second judging step determines that the display picto function execution operation has been instructed, third judging that the display picto function execution operation has been performed when (i) an operation to the unlock icon in the second display area is recognized by the checking step and (ii) a drag operation from the unlock icon in the second display area to the icon indicating the unlock position in the third display area is detected;
reading out, from the storage section, the one said processing stored in association with the display picto selected by the display picto function execution operation when the third judging step determines that the display picto function execution operation has been performed;
executing the read-out processing;
enabling only an operation for performing the specific display or the specific setting change;
within a predetermined time period after the second judging step determines that the display picto function execution operation has been instructed, fourth judges that the display picto function execution operation has not been performed when (i) recognition of the operation to the unlock icon in the second display area by the checking step and (ii) detection of the drag operation from the unlock icon in the second display area to the icon indicating the unlock position in the third display area have not been performed; and
maintaining the locked screen when the fourth judging step determines that the display picto function execution operation has not been performed.

9. A non-transitory computer-readable storage medium having stored thereon a program that is executable by a computer of a terminal device, the program being executable by the computer to perform steps comprising:
storing in a storage section of the terminal device in advance one processing desired by a user from among a plurality of processings related to a display picto function corresponding to each of a plurality of display pictos, in association with the each of the plurality of display pictos to be displayed in a first display area of a display section of the terminal device, wherein the one processing stored in association with the each of the plurality of display pictos is a processing of displaying only a specific piece of information of the corresponding display picto function or a processing of displaying only a setting change screen for changing a specific setting;
when a shift to a locked screen for preventing an erroneous operation to the display section is instructed, displaying one of the display pictos on the first display area in the locked screen, displaying an unlock icon on a second display area of the display section, and displaying an icon indicating an unlock position on a third display area of the display section;
checking whether an operation to the unlock icon in the second display area is detected;
after the checking step has recognized an operation to the unlock icon in the second display area, first judging that an unlock operation has been performed when a drag operation from the unlock icon in the second display area to the icon indicating the unlock position in the third display area is detected;

shifting the locked screen to a predetermined screen when the first judging step determines that the unlock operation has been performed;

before the check has recognized an operation to the unlock icon in the second display area, second judging that a display picto function execution operation has been instructed when an operation of selecting one of the display pictos in the first display area is detected;

within a predetermined time period after the second judging step determines that the display picto function execution operation has been instructed, third judging that the display picto function execution operation has been performed when (i) an operation to the unlock icon in the second display area is recognized by the checking step and (ii) a drag operation from the unlock icon in the second display area to the icon indicating the unlock position in the third display area is detected;

reading out, from the storage section, the one said processing stored in association with the display picto selected by the display picto function execution operation when the third judging step determines that the display picto function execution operation has been performed;

executing the read-out processing;

enabling only an operation for performing the specific display or the specific setting change;

within a predetermined time period after the second judging step determines that the display picto function execution operation has been instructed, fourth judges that the display picto function execution operation has not been performed when (i) recognition of the operation to the unlock icon in the second display area by the checking step and (ii) detection of the drag operation from the unlock icon in the second display area to the icon indicating the unlock position in the third display area have not been performed; and maintaining the locked screen when the fourth judging step determines that the display picto function execution operation has not been performed.

* * * * *